United States Patent [19]
Koizumi

[11] Patent Number: 5,254,895
[45] Date of Patent: Oct. 19, 1993

[54] MOTOR FOR DISC DRIVE

[75] Inventor: Shigeki Koizumi, Yokoze, Japan

[73] Assignee: Canon Denshi Kabushiki Kaisha, Chichibu, Japan

[21] Appl. No.: 740,510

[22] Filed: Aug. 5, 1991

[30] Foreign Application Priority Data

Aug. 6, 1990 [JP] Japan .................. 2-206900
Aug. 23, 1990 [JP] Japan .................. 2-087467

[51] Int. Cl.$^5$ ........................... H02K 21/12
[52] U.S. Cl. ..................... 310/156; 310/66; 310/67 R; 310/256; 310/268; 360/98.07; 360/99.07
[58] Field of Search ............ 310/256, 156, 67 R, 310/68 R, 40 MM, 75 R, 268, 66; 360/99.07, 99.04, 99.05, 99.12, 98.07, 99.03

[56] References Cited

U.S. PATENT DOCUMENTS

| | | | |
|---|---|---|---|
| Re. 33,813 | 2/1992 | von der Heide | 310/67 R |
| 4,570,093 | 2/1986 | Morii | 310/67 R |
| 4,604,665 | 8/1986 | Muller | 310/67 R |
| 4,626,727 | 12/1986 | Janson | 310/268 |
| 4,658,944 | 4/1987 | Kogure | 360/99.09 |
| 4,700,242 | 10/1987 | Sakaguchi | 360/99.03 |
| 4,855,850 | 8/1989 | Nagaoka | 360/99.05 |
| 5,015,893 | 5/1991 | Shiozawa | 310/67 R |
| 5,028,829 | 7/1991 | Cap | 310/256 |
| 5,121,272 | 6/1992 | Maekawa | 360/99.04 |
| 5,126,900 | 6/1992 | Munekata | 360/99.05 |

*Primary Examiner*—R. Skudy
*Attorney, Agent, or Firm*—Spencer, Frank & Schneider

[57] ABSTRACT

A disc driving motor for rotating a recording medium in the form of a disc of the type having a disc-shaped rotor yoke around the outer peripheral portion of which is securely joined a driving magnet for generating a rotating force, an auxiliary yoke attached around the outer periphery of the rotor yoke so as to avoid magnetic saturation of the rotor yoke and leakage of the magnetic fluxes from the driving magnet through the outer peripheral portion of the rotor yoke to the exterior. The tops of screws for securely maintaining the core yoke at a predetermined position are not extended beyond the surface of the core yoke in opposing relationship with the rotor yoke.

4 Claims, 11 Drawing Sheets

MOTOR FOR DISC DRIVE

BACKGROUND OF THE INVENTION

1. Field of the Invention

The present invention relates to a motor for a disc drive and more particularly to a motor for a disc drive for driving a recording medium in the form of a disc so as to write and read data onto and out of the disc.

2. Description of the Prior Art

A typical example of a disc driving device of the type described above is a floppy disc drive unit (to be referred to as "an FDD" hereinafter in this specification) for writing and reading data onto and out of a floppy disc which is a magnetic recording medium.

Figure 12:
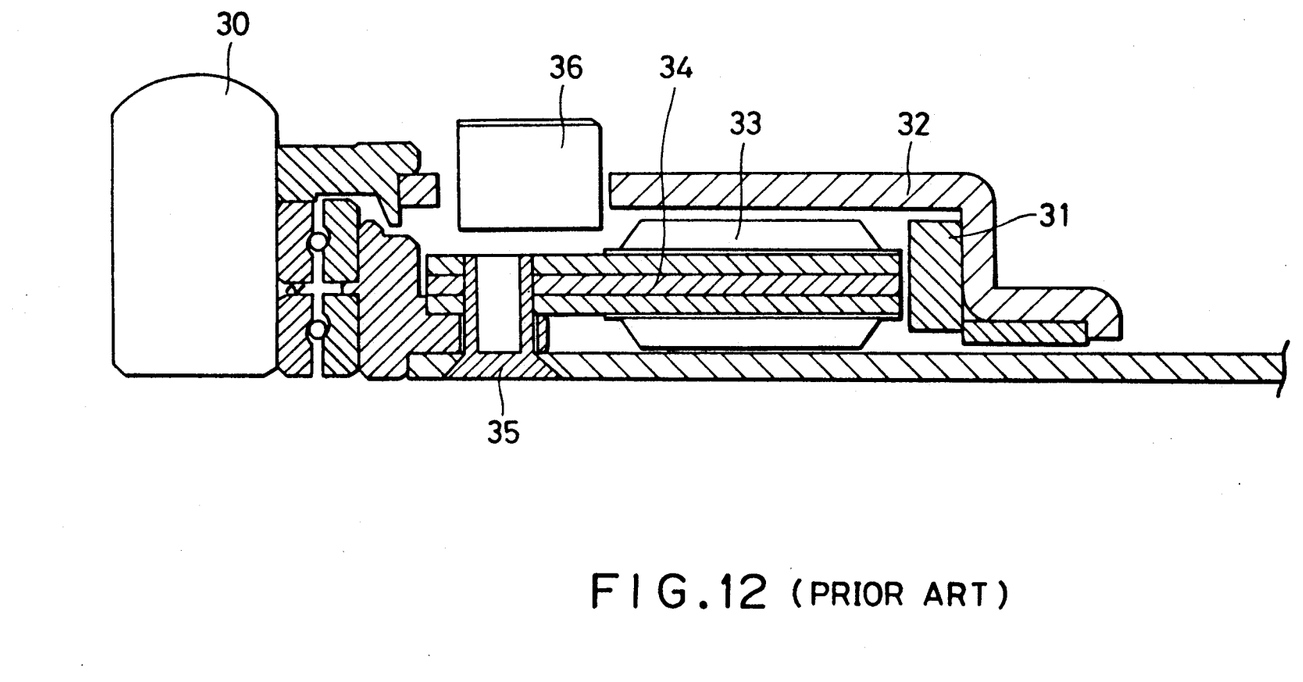
FIG. 12 is a longitudinal sectional view used to explain a conventional FFD motor yoke.

Especially, as a disc driving motor of a driving source for rotating a disc in a 3.5"-FDD, a so-called surfaces opposing type motor is used. As shown in FIG. 12, the surfaces opposing type motor comprises a disc-shaped rotor yoke 32 whose center coincides with that of a spindle shaft 30 and on the cylindrical peripheral surface thereof is mounted a driving magnet 31 disposed in parallel and opposing relationship with a projected type core yoke 34 wound with a coil 33. In the 3.5"-FDD of the type using the above-mentioned motor, it is impossible, if a 3.5"-FDD thin structure is to be obtained to stack a magnetic head mounted on a head carriage on the motor in the vertical direction so that they are disposed on the same plane in a closely-spaced apart relationship. As a result, there arises a problem of leakage flux from the driving magnet 31 mounted on the outer peripheral surface of the rotor yoke 32 because it is close closer to a magnetic head.

In order to solve this problem and to cope with the magnetic saturation of the rotor yoke 32, the thickness of the entire rotor yoke 32 has been increased so as to prevent the magnetic saturation thereof and the adverse effect of the magnetic flux from the driving magnet 31 on the magnetic head.

However, there arises another problem that the thicker the whole rotor yoke 32 is made, the thicker the FDD becomes.

Furthermore, the thickness of the FDD is also increased for the following reason. In order to securely maintain the core yoke 34 in a stationary state, a screw through hole 35 (not internally threaded) is extended from a surface (lower surface) of the core yoke 34 which is not in opposing relationship with the rotor yoke 32 to a surface (upper surface) of the core yoke 34 which is in opposing relationship with the rotor yoke 32. A small screw is extended through one of the component members of the motor and the screw hole 35 from the lower surface to the upper surface of the core yoke 34 beyond the latter and a nut (not shown) is threadably engaged with the screw, whereby the core yoke 34 is securely fixed. The core yoke 34 is a laminated body consisting of a plurality of ferromagnetic sheets or the like laminated one upon another.

However, in order to make FDDs still thinner, a construction has been recently proposed and used in which a driving pin 36 of a chucking mechanism for holding a disc which engages the disc and transmits the rotating force thereto is vertically movably mounted on the rotor yoke 32 of the disc driving motor. With this construction, in order to prevent the vertically movable driving pin 36 on the side of the rotor yoke 32 from colliding with the core yoke 34, a space must be provided between the rotor yoke 32 and the core yoke 34. When the upper end portion of the screw and also the nut are projected beyond the upper surface of the core yoke 34, the height of the space must be increased so as to avoid collision of the driving pin 36 against the screw or the nut projecting beyond the upper surface of the core yoke. Thus, this construction becomes a problem which must be solved before making the FDDs still thinner.

A further problem encountered is that it takes a relatively large number of assembly steps, including the step for securely maintaining the laminated body, because the core yoke 34 is in the form of a laminated body.

SUMMARY OF THE INVENTION

It is a first object of the present invention to solve the above mentioned problems, thereby making an entire disc driving motor thin in construction.

It is a second object of the present invention to prevent magnetic saturation of the rotor yoke and the leakage flux without making the whole motor construction thicker.

It is a third object of the present invention to provide a construction which can prevent a screw for securely maintaining the core yoke in the stationary state from extending beyond the surface of the core yoke in opposing relationship with the rotor yoke.

It is a fourth object of the present invention to form a motor housing integral with the center of the core yoke by molding.

In the first aspect of the present invention, a motor for a disc drive for rotating a recording medium in the form of a disc, comprises:

a rotor yoke upon which are mounted components of a chucking mechanism for holding the disc;

a driving magnet for generating a rotating force, the driving magnet being securely joined to the outer peripheral portion of the rotor yoke;

a core yoke with a coil mounted thereon disposed in parallel and in opposing relationship with the rotor yoke; and an auxiliary yoke joined around the outer peripheral portion of the rotor yoke, thereby preventing magnetic saturation of the rotor yoke and leakage of the magnetic flux from the driving magnet through the outer peripheral portion of the rotor yoke to the exterior.

Here, the auxiliary yoke may be overlaid over the portion of the outer peripheral portion of the rotor yoke upon which is joined the driving magnet.

The portion, constituting the auxiliary yoke, of the outer peripheral portion of the rotor yoke upon which is joined the driving magnet may be a component independent of a main body of the rotor yoke and may be thicker than the main body and joined to the main body of the rotor yoke.

In the second aspect of the present invention, a motor for a disc drive for rotating a recording medium in the form of a disc, comprises:

a rotor yoke upon which are mounted components of a chucking mechanism for holding the disc;

a driving magnet for generating a rotating force, the driving magnet being joined to the outer peripheral portion of the rotor yoke;

a core yoke, having threaded holes and a coil mounted thereon, disposed in parallel and in opposing relationship with the rotor yoke; and screws which are screwed into the threaded holes, respectively, formed through the core yoke in such a way that the tops of the screws will not extend beyond the surface of the core yoke in opposing relationship with the rotor yoke.

In the third aspect of the present invention, a motor for a disc drive for rotating a recording medium in the form of a disc, comprises:

a rotor yoke upon which are mounted components of a chucking mechanism for holding the disc;

a driving magnet for generating a rotating force, the driving magnet being securely joined to the outer peripheral portion of the rotor yoke;

a core yoke with a coil mounted thereon disposed in parallel and in opposing relationship with the rotor yoke; and a housing for securely maintaining the core yoke at a predetermined position which is formed integral with the center portion of the core yoke by the molding process.

Here, the housing may be securely maintained at a predetermined position by mold tapping screws in such a way that the tops of the screws will not extend beyond the surface of the housing in opposing relationship with the rotor yoke.

The core yoke may be in the form of a laminated body formed by laminating a plurality of sheets one upon another, and the plurality of sheets may be held by the housing and securely laminated one upon another.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The present invention will become more apparent from the following preferred embodiments thereof taken in conjunction with the accompanying drawings.

FIRST EMBODIMENT, FIGS. 1-9

Figure 1:
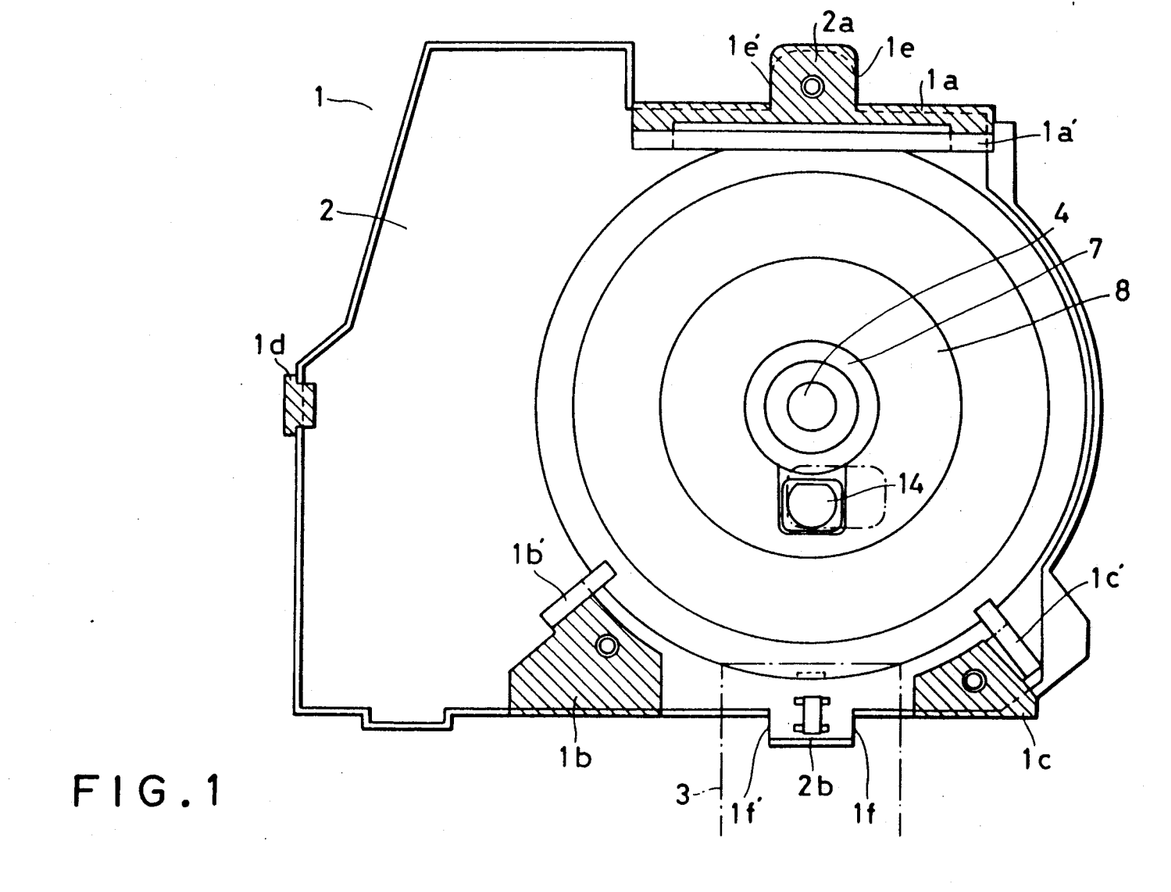
FIG. 1 is a top view of an FDD spindle motor of a first embodiment of the present invention.
Figure 2:
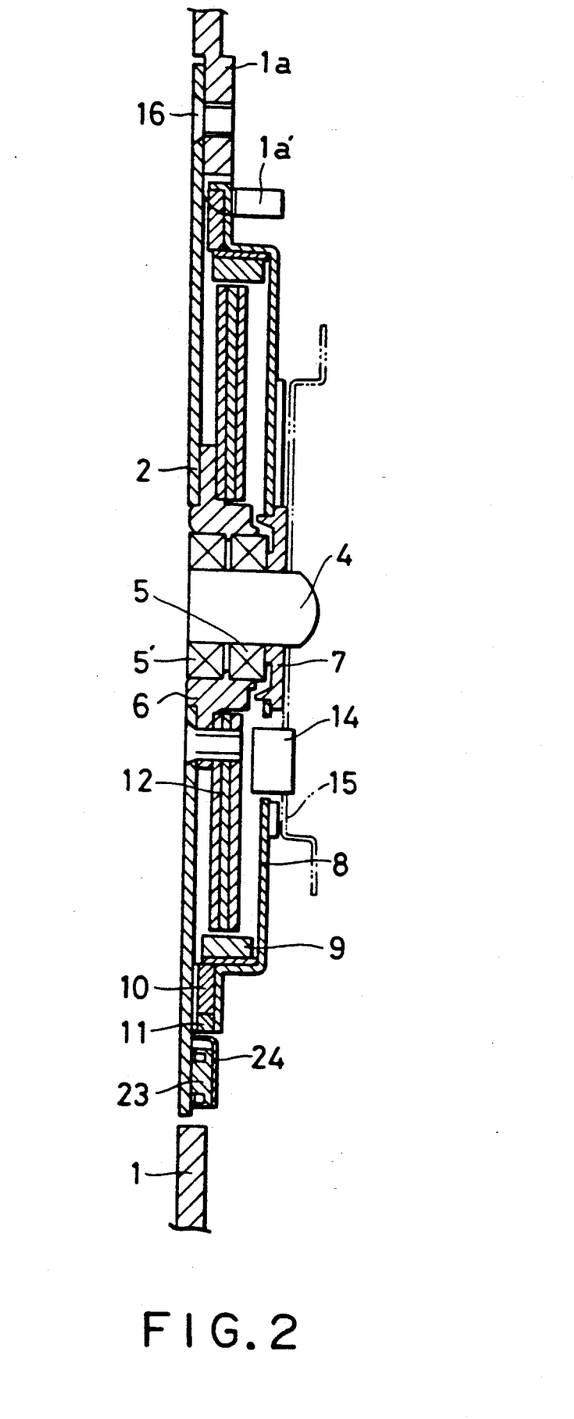
FIG. 2 is a longitudinal sectional view thereof.

FIG. 1 is a top view of a direct drive spindle motor (to be referred to as "a motor" hereinafter in this specification) used for a 3.5"-FDD in accordance with the present invention and FIG. 2 is a longitudinal sectional view thereof.

In FIGS. 1 and 2, reference numeral 1 denotes an FDD base made of a sheet of aluminum or steel; and 2, a metal base of the motor which also serves as a circuit substrate. In general, the metal substrate 2 comprises a base made of a silicon steel or the like over which is coated an insulating material. A circuit pattern is printed over the insulating coat. Electronic components of a drive control circuit for driving the motor are soldered to the substrate 2.

The substrate 2 is securely attached with screws 16 to the back surfaces of stationary reference surfaces 1a, 1b and 1c which are formed by a semi-punching or drawing process of the base 1. With the above-mentioned construction, the substrate 2 can be attached to the bottom surface of the base 1 without extending beyond it. Projected portions 2a and 2b of the substrate 2 are fitted in the lateral direction into the spaces defined by the reference surfaces 1e and 1e' and by the reference surfaces 1f and 1f' so that the lateral position of the substrate 2 can be securely defined.

The base 1 has retainers 1a', 1b' and 1c' which are formed by bending some portions of the base 1 in order to prevent a rotor yoke 8 from falling down. The upper surfaces of the retainers 1a', 1b' and 1c' serve to receive a disc in such a way that a floppy disc (not shown) can be prevented from making sliding contact with the rotor yoke 8.

Figure 3:
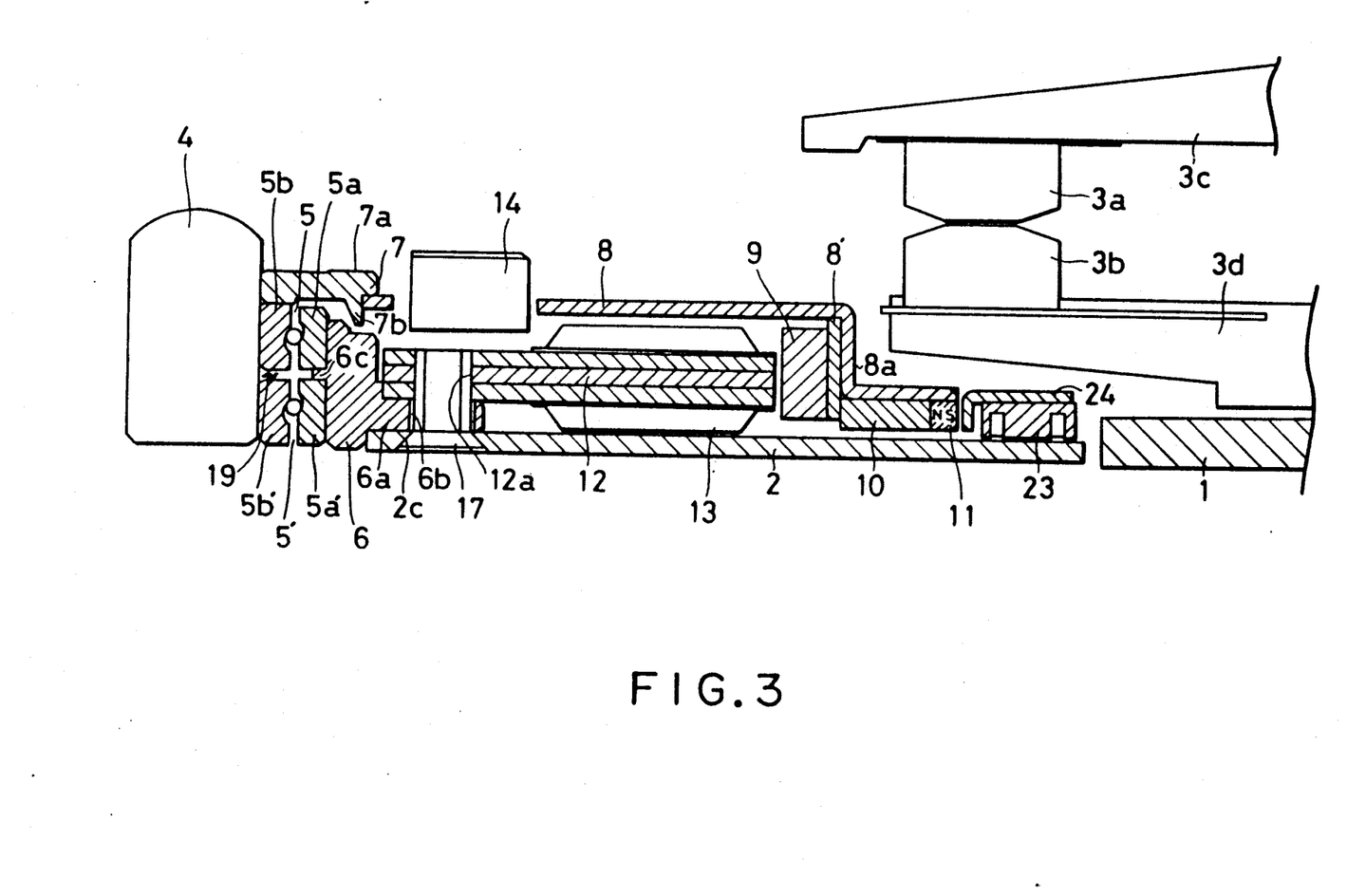
FIG. 3 is a view illustrating, on an enlarged scale, the major components thereof.

In FIGS. 2 and 3, a spindle shaft 4 which is the output shaft of the motor is the center of rotation of the rotor yoke 8 and a center hub 15 of the floppy disc, respectively.

The spindle shaft 4 is rotatably supported by ball bearings 5 and 5' (to be referred to as "bearings" hereinafter in this specification) which in turn are securely mounted within a cylindrical housing 6 securely joined to the substrate 2.

The outer rings 5a and 5a' of the bearings 5 and 5' are force-fitted into the housing 6 so that the outer cylindrical peripheral surfaces of the bearings 5 and 5' are securely made into close contact with the inner cylindrical surface of the housing 6. The outer rings 5a and 5a' are spaced apart from each other by a predetermined distance by a ring-shaped projection 6c extended from the inner cylindrical surface of the housing 6. A wave-washer shaped bias spring 19 is interposed between the inner rings 5b and 5b' and the spindle shaft 4 is rotatably fitted into the inner rings 5b and 5b' in such a way that the spindle shaft 4 can be fitted into and pulled out of the inner rings 5b and 5b'.

A flange 7 which is a rotating member and whose upper peripheral portion 7a is a surface upon which the hub 15 of the disc is mounted is force-fitted over the upper portion of the spindle shaft 4 and the disc-shaped rotor yoke 8 made of a ferromagnetic material such as iron is fitted over the outer peripheral cylindrical surface of the flange 7 and is securely joined thereto by caulking or any other suitable method.

Joined securely to the peripheral portion of the lower surface of the rotor yoke 8 is a driving magnet 9 for producing the driving force of the motor, an FG magnet 10 which is one of the components of an FG (a frequency generator) for generating the signal whose frequency represents the rotational speed of the motor and an index magnet 11 which coacts with a Hall element 23 so as to generate a signal representative of a detected position.

Due to the magnetic attraction force acting between the magnets 9, 10 and 11 on the one hand and the substrate 2 and a core yoke 12 on the other hand and because of the weights of the components 4 and 7-10 i.e., shaft 4, flange 7, rotor yoke 8, driving magnet 9 and FG magnet 10, the rotor yoke 8 is biased and pulled downwardly in FIG. 3 so that the flange 7 is biased downwardly to contact with and push downwardly the inner ring 5b of the bearing 5. Because of the biasing force acting on the flange 7 in the manner described above, the thrust load acts downwardly on the inner ring 5b and is transmitted through the bias spring 19 to and acts on the inner ring 5b' of the lower bearing 5'. In other words or relatively speaking, the thrust load acts on the outer rings 5a and 5a' upwardly. Because of this thrust load, the bearings 5 and 5' are biased so that play is eliminated. Furthermore, due to the contact of the flange 7 with the inner ring 5b, the position in the direction of thrust of the spindle shaft 4 can be determined and securely maintained.

It should be noted here that the spring force of the bias spring 19 is so determined as to be on the order of one half of the biasing force which biases the flange 7 downwardly so that the rigidity of the lower bearing 5' can be maintained. Then, the two bearings 5 and 5' share the thrust load so that a bearing construction causing no loss can be provided. However, the force of the bias spring 19 can be selected to be sufficiently greater than the above-mentioned biasing force. Then, regardless of the magnitude of the above-mentioned biasing force, the position in the direction of the thrust (the vertical direction in FIG. 3) of the flange 7 can be maintained always at a predetermined position and will never change. Furthermore, the advantage that the rigidity of the bearings can be increased can be attained.

As the bias spring 19, a coiled spring or other elastic means may be used.

The outer peripheral portion of the disc-shaped rotor yoke 8 is bent in the form of a letter L and a ring-shaped auxiliary yoke 8' is brought into contact with and securely joined to the inner surface of a vertical bent portion 8a of the L-shaped portion and the driving magnet 9 is securely joined to the inner surface of the auxiliary yoke 8'. The auxiliary yoke 8' is provided according to the present invention so that magnetic saturation of the rotor yoke 8 can be prevented and also leakage of the magnetic flux of the driving magnet 9 through the outer peripheral portion of the rotor yoke 8 to the exterior; that is, leakage of the magnetic flux to magnetic heads 3a and 3b mounted on arms 3c and 3d, respectively, of a head carriage. The auxiliary yoke 8' is made of a ferromagnetic material such as iron.

As described in detail above, according to the prior art the entire rotor yoke 32 is thickened as shown in FIG. 12 so that there arises the problem that the entire motor is increased in thickness and consequently the FDD becomes thick. On the other hand, according to the first embodiment of the present invention, the auxiliary yoke 8' is overlaid over the outer peripheral surface of the vertical bent portion 8a of the rotor yoke 8 which covers the outer side of the driving magnets 9 and is disposed in the vicinity of the magnetic heads 3a and 3b so that the portion which causes the problem is especially increased in its magnetic path cross section. As a result, without the increase in thickness of the entire rotor yoke 8, the problems of leakage flux and magnetic saturation are prevented. Since the rotor yoke 8 can be made thinner so that the entire motor can be made compact in thickness, the FDDs can also be made thinner.

Figure 4:
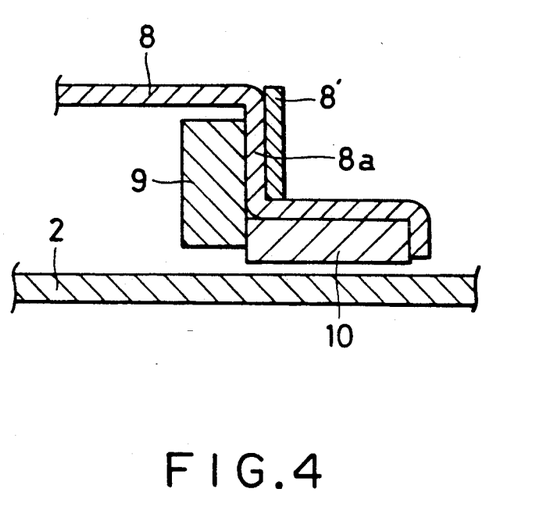
FIG. 4 is a longitudinal cross sectional view illustrating a first modification of the outer peripheral surface of the yoke motor shown in FIG. 3.
Figure 5:
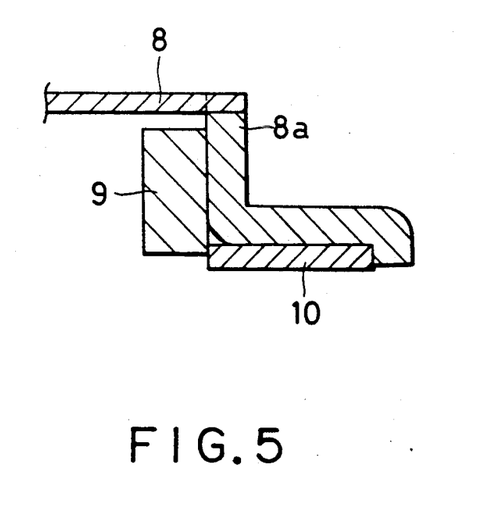
FIG. 5 is a longitudinal cross sectional view of a second modification of the outer peripheral surface shown in FIG. 3.

According to the first modification of the first embodiment of the present invention, as best shown in FIG. 4, the auxiliary yoke 8' can be disposed so as to surround the outer cylindrical surface of the vertical bent portion 8a of the rotor yoke 8. Furthermore, as shown in FIG. 5, in the second modification of the first embodiment of the invention, the vertical cylindrical bent portion 8a can be made separately from the main body of the rotor yoke 8. The vertical bent portion 8a can be made thicker than that of the main body of the rotor yoke 8 and fitted into the main body by caulking or any other suitable method so that the vertical bent portion 8a is securely held in position. The effects described above can be also equally attained.

The driving magnet 9 is fabricated in the form of a ring and consists of from 8 to 16 magnetic poles whose N and S poles are alternately arranged. The projected type core yoke 12 is disposed in parallel with and in opposing relationship with the rotor yoke 8 and in opposing relationship with the inner peripheral surface of the driving magnet 9. In general, the core yoke 12 is formed with from 6 to 18 projections each of which mounts a coil 13. As is well known in the art, when the coils 13 are alternately excited by a current switching circuit, due to the attraction and repulsion of the electromagnetic forces acting between the coils 13 and the magnet 9, the magnet 9 is forced to rotate so that the rotation thereof is transmitted to the rotor yoke 8, the flange 7 and shaft 4.

The FG magnet 10 is fabricated from a ferrite magnet of the rubber series and has ten magnetized poles over the entire periphery thereof. An electric circuit pattern (not shown) is printed over the upper surface of the metal base 2 which is in opposing relationship with the FG magnet 10. During rotation of the motor, a signal whose frequency represents the rotational speed of the motor is generated in the FG pattern. Index magnets 11 are securely attached to predetermined positions, respectively, over the outer peripheral portion of the lower surface of the vertical bent portion 8a and coacts with the Hall element 23, which is a sensor, so that the index for detecting a predetermined rotational position which corresponds to the starting position of the tracks of a disk as described above can be detected. A yoke 24 which collects the magnetic flux and direct it to the Hall element 23 is disposed on the Hall element 23. In the first embodiment, the Hall element 23 is disposed in the vicinity of the lower side of the magnetic head pair 3a and 3b. As shown in FIG. 3, when the index magnet 11 is magnetized in the radial direction of the rotor yoke 8, the flux from the index magnet 11 frequently adversely affects the magnetic heads 3a and 3b. However, in general, one rotation of the 3.5"FDD takes 200 ms and there is nonrecording region spaced apart by about 2.5 ms from the index position indexed by the index magnet 11, and at the upstream side from the index position there is also a non-recording region space apart by about 12 ms from the index position. Therefore when the index magnet 11 passes past the lower side of the magnetic head pair 3a, 3b within this 14.5 ms region the adverse influence of the index magnet 11 is negligible. The Hall element 23 may be disposed at a position where it is shifted from the position shown in FIG. 3 and the shape of the yoke 24 is so designed as to absorb magnetic flux in a path from the position of the yoke 24 indicated in FIG. 3 to the Hall element 23.

Figure 6:
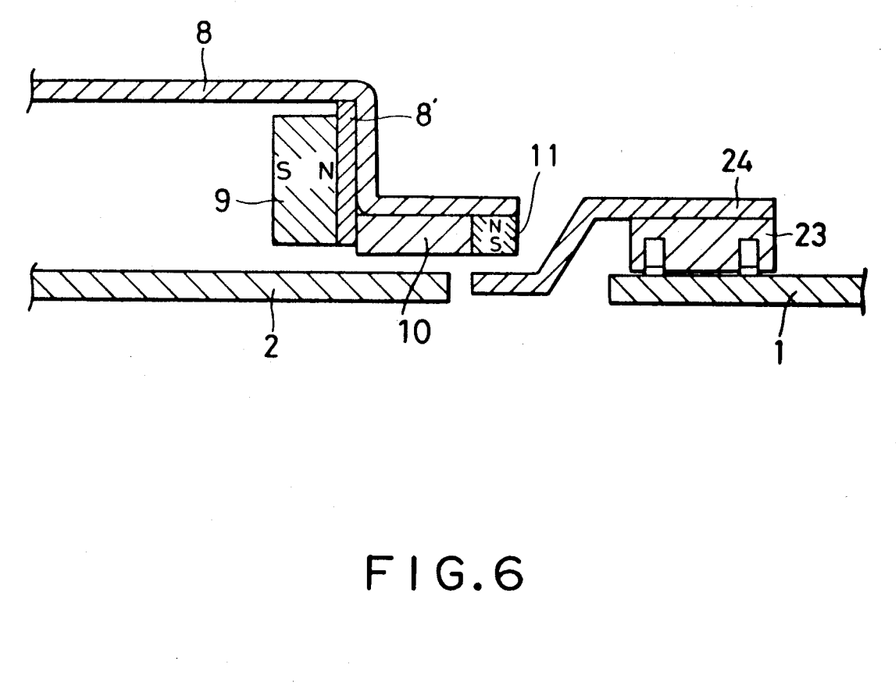
FIG. 6 is a view illustrating a modification of an index sensor shown in FIG. 3.

FIG. 6 illustrates an embodiment in which the magnetized direction of the index magnet 11 is vertical. In this case, the leading end of the yoke 24 is located at the position in the vicinity immediately below the magnet 11 and the yoke 24 is so fabricated and bent as to draw the magnetic flux to the Hall element 23. Then the leakage flux to the magnetic head pair 3a and 3b can be decreased and it is not necessary to dispose the Hall element 23 in the vicinity of the lower side of the magnetic head pair.

Referring to FIG. 3 again, the core yoke 12 is securely attached to the flange portion 6a of the housing 6. Therefore, the disc-shaped center portion of the core yoke 12 has a plurality of tapped holes 12a which are formed along the inner peripheral portion thereof. The substrate 2 and the flange 6a of the housing 6 also have tapped holes 2c and 6b, respectively, in coaxial relationship with the tapped hole 12a. When a screw 17 is inserted through the tapped holes 2c and 6b and brought into threading engagement with the tapped hole 12a, the core yoke 12 together with the housing 6 are securely mounted on the substrate 2.

According to the above-described design and construction for securely attaching the core yoke 12, the tapped hole 12a is internally threaded so that the core yoke 12 can be securely maintained at a predetermined position without the use of a nut. In other words, nuts are not extended beyond the upper surface of the core yoke 12 so that the core yoke 12 can be spaced apart from a driving pin 14 by a suitable distance. As a result, interference between the core yoke 12 and the driving pin 14 can be avoided and this design and construction are advantageous for making the FDDs thin or compact in size.

More specifically, in the case of the 3.5"FDDs, the driving pin 14 for transmitting the rotating force to a disc is disposed at a position offset from the center of rotation of the motor. As will be described in detail with reference to FIGS. 7-9, in the case of chucking of the disc, when the engaging hole 15a of the hub 15 for engagement with the driving pin 14 is not brought to the position immediately above the driving pin 14, the pin 14 is pushed downwardly as illustrated by the phantom lines in FIG. 8. It follows therefore that a space for preventing interference between the driving pin 14 and the core yoke 12 must be provided above the core yoke 12, but when nuts are not extended beyond the upper surface of the core yoke 12 as described above, the height of the space can be reduced by the space occupied by each of the nuts beyond the upper surface of the core yoke 12 so that the FDDs can be reduced in thickness.

Figure 7:
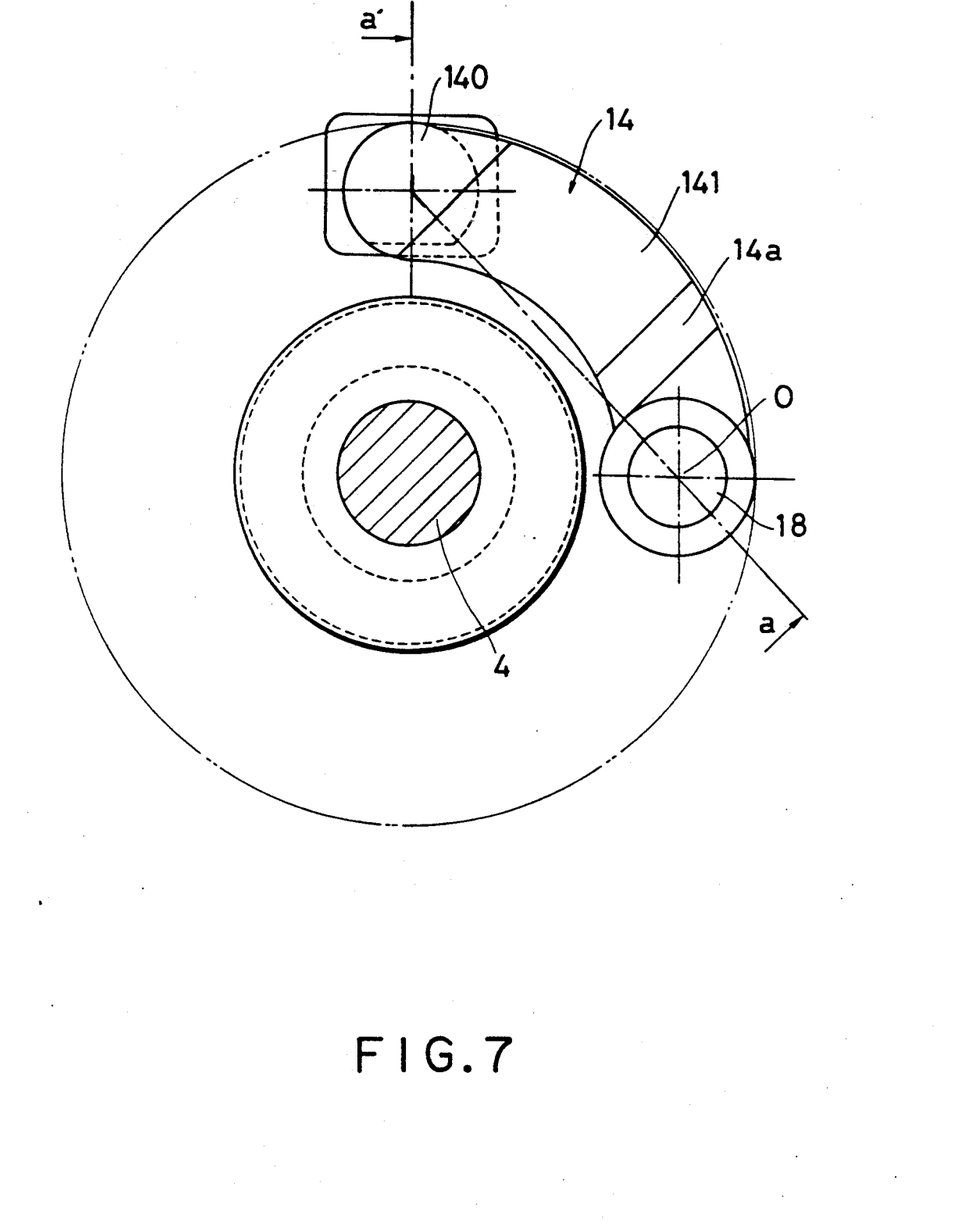
FIG. 7 is a bottom view of a chucking mechanism shown in FIG. 3.
Figure 8:
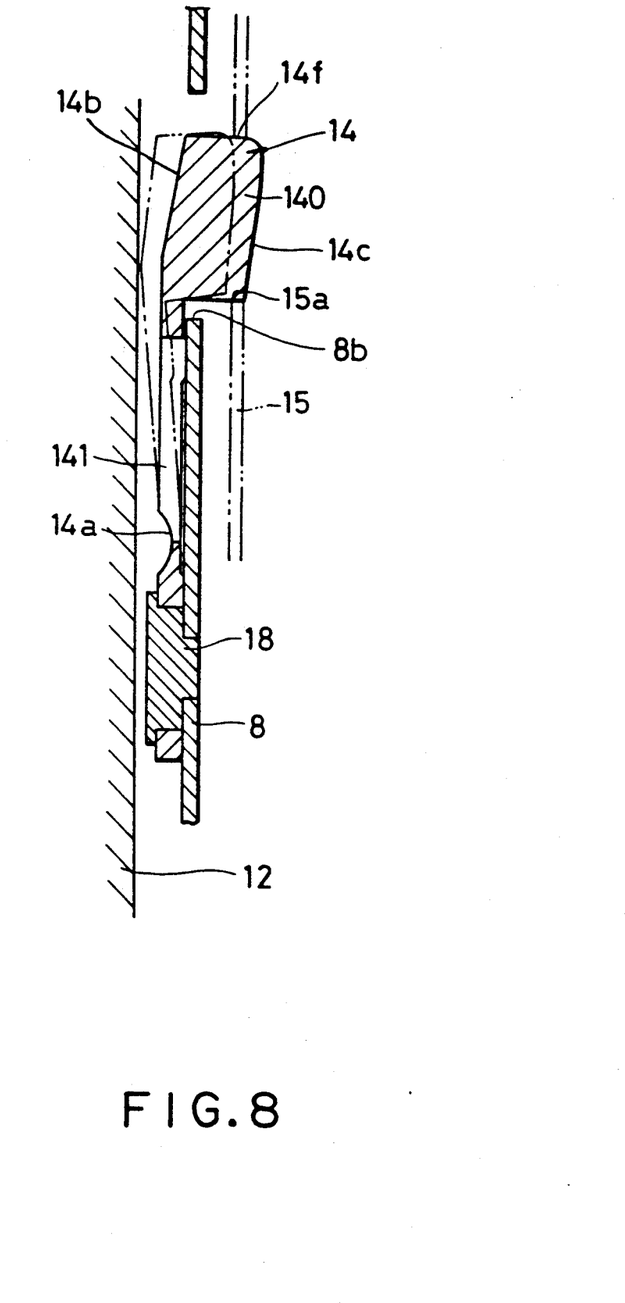
FIG. 8 is a sectional view taken along the line a—a' of FIG. 7.
Figure 9:
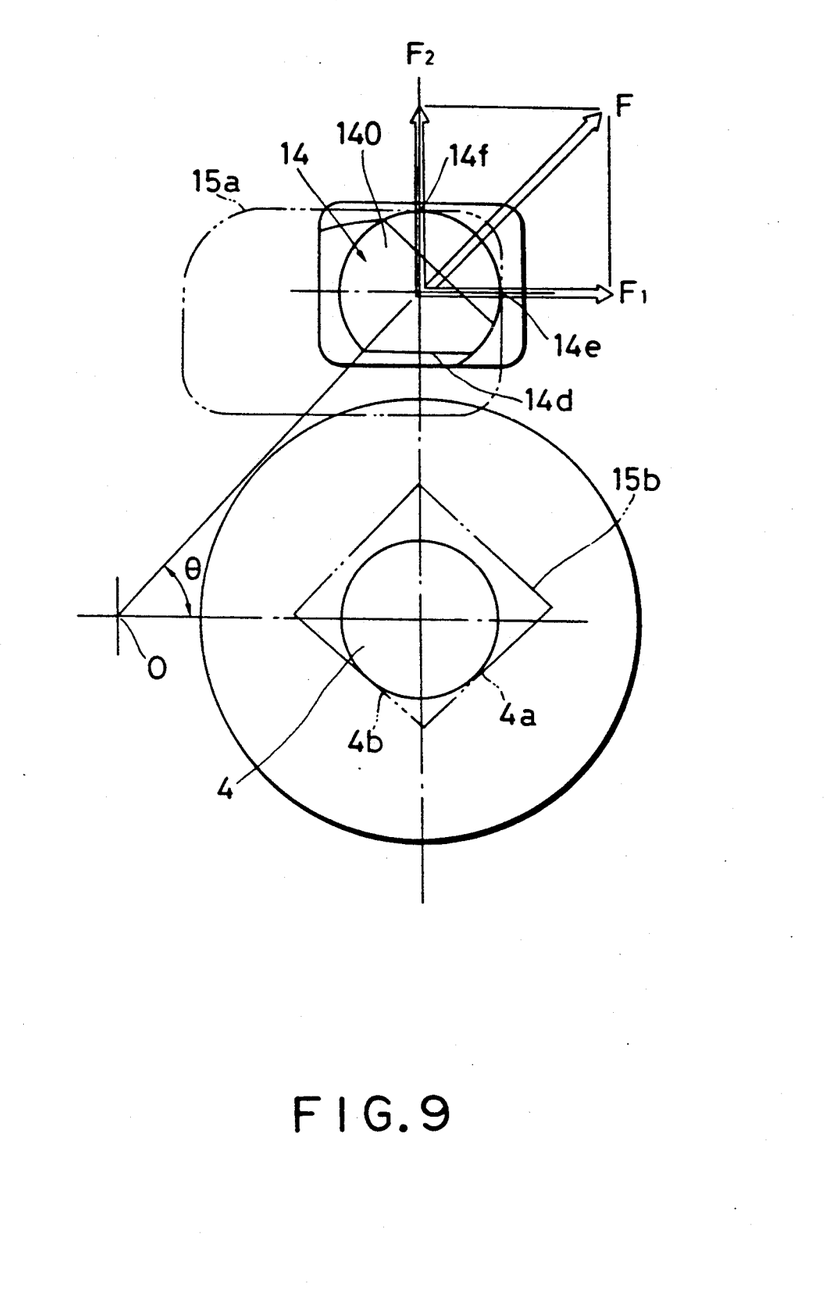
FIG. 9 is a top view to explain the mode of operation of the chucking mechanism.

Referring next to FIGS. 7-9, an FDD chucking mechanism will be explained. FIG. 7 is a bottom view illustrating the major components of the chucking mechanism; FIG. 8 is a sectional view taken along the line a—a' of FIG. 7; and FIG. 9 is a top view.

The driving pin 14 whose entire construction is illustrated in FIG. 8 comprises a pin main body 140 and a lever portion 141 connected to the lower end of the pin main body 140. The entire driving pin 14 is fabricated as an integral unit by the molding process. The right end portion of the lever 141 is rotatably pivoted on a shaft 18 which in turn is securely joined to the rotor yoke 8 by caulking or any other suitable method. The center portion of the lever 141 is made thin in thickness, forming an elastically deformable hinge portion 14a. The portion between hinge portion 14a of the lever 141 and the pin main body 140 is previously so fabricated that it is inclined by a few degrees upwardly and is lightly pressed on the rotor yoke 8 under the force of the hinge portion 14a. Therefore, the pin main body 140 is extended upwardly beyond the upper surface of the rotor yoke 8 through a hole 8b formed therethrough.

In the case of chucking a floppy disc, first the hub 15 of the disc is mounted on the rotor yoke 8 (upon the flange 7) and as shown in FIG. 9, the spindle shaft 4 is inserted into the center hole 15b of the hub 15. In this case, when the hole 15a of the hub 15 is not aligned with the driving pin 14, the pin main body 140 is pushed down by the hub 15 so that the hinge portion 14a is bent and the whole driving pin 14 is caused to move downwardly to the position illustrated by the phantom line in FIG. 8. When the motor is energized so that the driving pin 14 is brought to the position immediately below the hole 15a, the driving pin 14 is returned upwardly under the force of the hinge portion 14a and then inserted into the hole 15a so that the outer peripheral portion 14e of the pin main body 140 engages with the edge of the hole 15a, whereby the rotating force of the motor is transmitted to the hub 15, causing the disc to rotate.

Except the hinge portion 14a, the driving pin 14 is made rigid so that when the outer peripheral portion 14e engages with the edge of the hole 15a, the outer peripheral portion 14e presses the edge of the hole 15a with the force F1. Then, due to the reaction, the driving pin 14 is pushed outwardly so that the outer peripheral portion 14f engages with the edge of the hole 15a. This pushing force $F_2$ is expressed by $$F_2 = F_1 \cdot \tan\theta - \alpha$$

where $\theta$ = the angle between a line interconnecting the center 0 of the shaft 18 on the one hand and the center of the pin main body 140 on the other hand and a line interconnecting the center 0 and the center of the spindle shaft 4; and $\alpha$ = the frictional force between the rotor yoke 8 and the driving pin 14. The value $\alpha$ can be made negligible when the force of the driving pin 14 acting on the rotor yoke 8 upwardly is decreased and when the driving pin 14 is made of a material with a high degree of sliding capability such as a polyacetal resin.

When the force $F_2$ of the driving pin 14 pushes the hub 15 outwardly, two sides of the center hole 15b of the hub 15 are forced into contact with two points 4a and 4b, respectively, of the spindle shaft 4, whereby the centering of the disc can be accomplished. As described above, only the driving pin 14 constitutes a chucking mechanism and the centering can be accomplished only by the driving pin.

The driving pin 14 can be fabricated from a material adapted to be molded so that its shape can be freely selected. When the upper and lower surfaces of the pin main body 140 are tapered as shown in FIG. 8, downward projection of the driving pin 14 can be reduced by a tapered portion 14b. When the pin main body 140 is pushed downwardly by another tapered portion 14c, the surface of the driving pin main body 140 becomes horizontal so that the pushing stroke itself can be minimized. In addition, when a portion indicated by 14d of the pin main body 140 is cut off, the inner width of the rotor yoke 8 can be increased so that fabrication of the rotor yoke 8 can be facilitated.

It should be noted here that when the outer peripheral portions 14e and 14f which are brought into contact with the edge of the hole 14a are rounded, they are easily subjected to wear so that they can be made flat.

As described above, according to the first embodiment of the present invention, the auxiliary yoke 8' is overlaid over the bent portion of the outer peripheral portion of the rotor yoke 8 or the bent portion 8a of the outer peripheral portion of the rotor yoke 8 is fabricated separately from the main body of the rotor yoke 8 and is made thicker than the main body of the rotor yoke 8 and then assembled therewith so that magnetic saturation of the yoke 8 and leakage of the magnetic flux to the magnetic heads 3a and 3b is minimized or eliminated. Since the rotor yoke 8 can be made thin, the entire motor construction can also be made thin and consequently the FDDs can be made thin.

Furthermore, according to the first embodiment, as described above, the screws 17 for securely maintaining the core yoke 12 at a predetermined position, are inserted into and tightly threadably engaged with the internally threaded screw holes 12a, respectively, tapped through the core yoke 12 and do not extend beyond the upper surface of the core yoke 12 so that the height of the space which must be defined between the rotor yoke 8 and the core yoke 12 can be lowered so that the entire height of the motor can be made lower and consequently the FDDs can be made thinner.

According to the present invention, the housing 6 can be formed integral with the center portion of the core yoke 12 by molding so that the sheets of the core yoke 12 can be tightly laminated one over another and the core yoke 12 is securely joined to the housing 6. As a result, the assembly of the core yoke 12 is considerably facilitated and therefore the costs of FDDs can be decreased accordingly.

Figure 10:
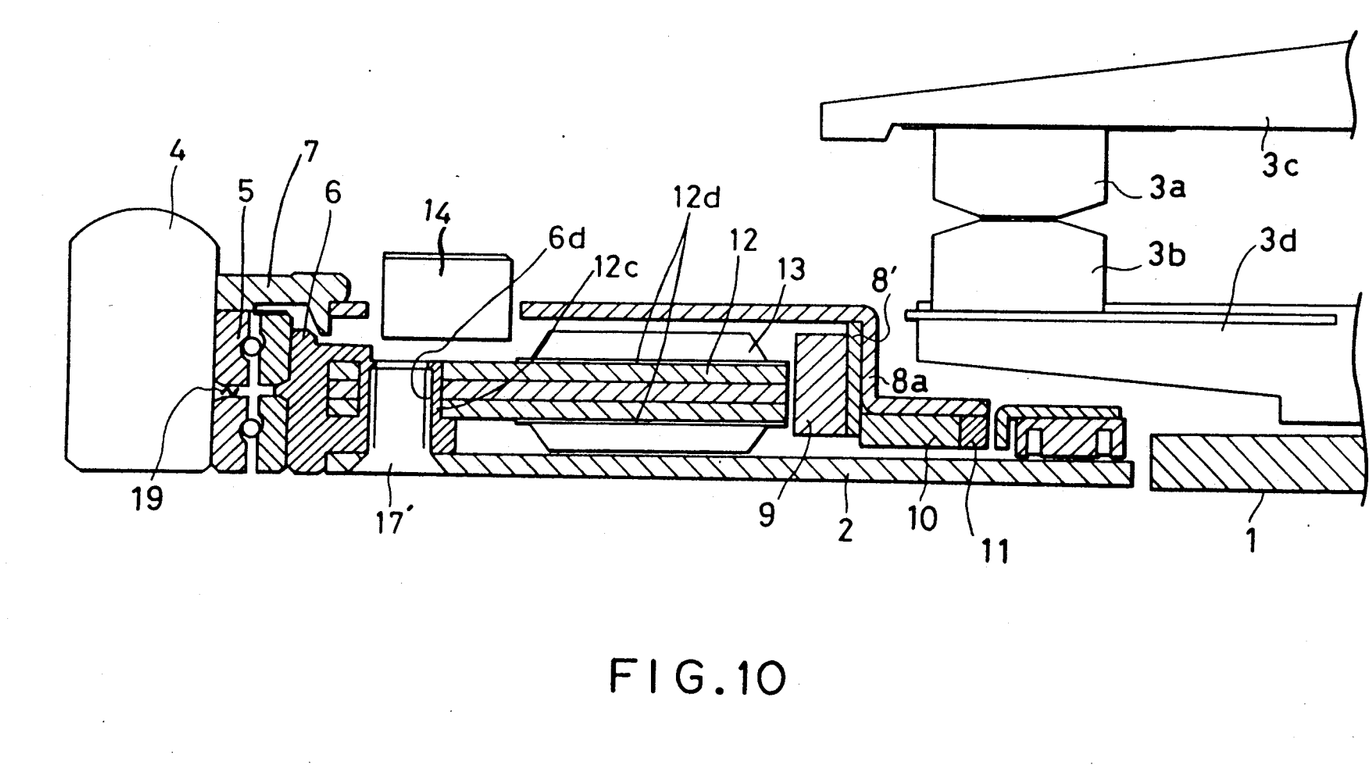
FIG. 10 is a longitudinal sectional view of a second embodiment of the present invention illustrating the major components of a motor thereof.
Figure 11:
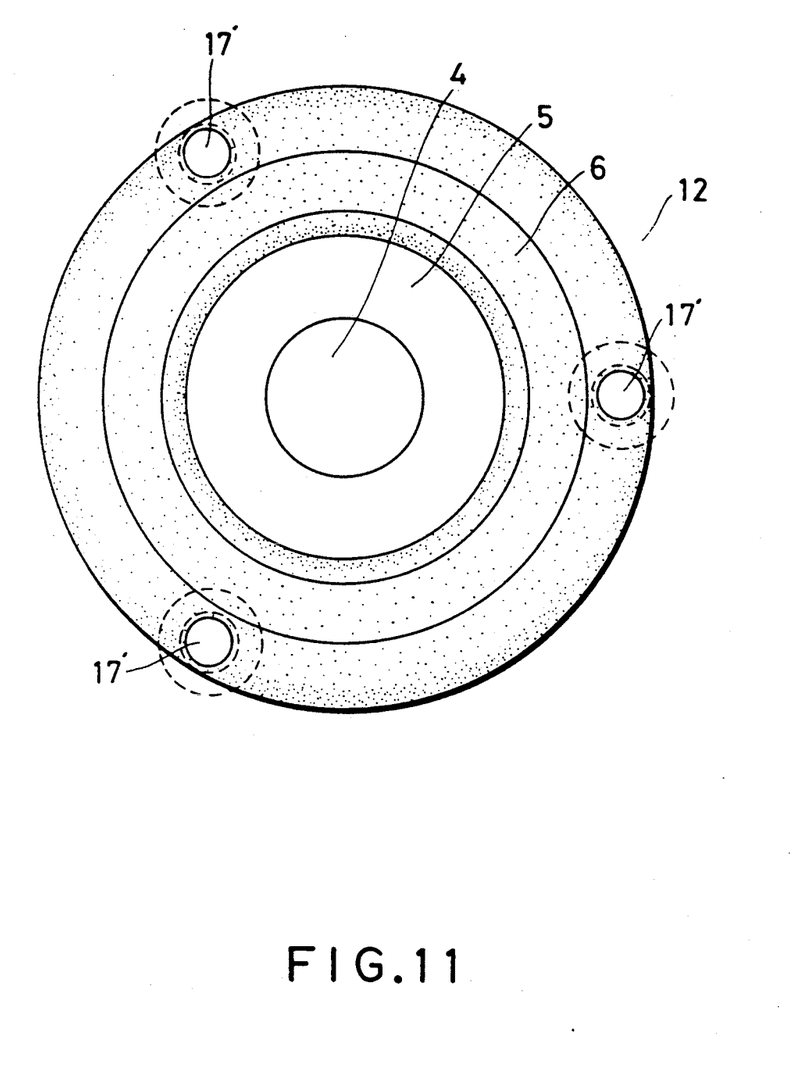
FIG. 11 is a top view thereof.

SECOND EMBODIMENT, FIGS. 10 and 11

Referring now to FIGS. 10 and 11, a plurality of sheets which are laminated to form the core yoke 12 are punched by a mechanical press; the laminated core yoke 12 is placed into molding dies; and molded integral with and coaxially of the housing 6 in such a way that the housing 6 vertically surrounds the center portion of the core yoke 12, whereby the core yoke 12 is securely joined to the housing 6. The housing 6 and the core yoke 12 are securely mounted on the substrate 2 with setscrews 17'.

The core yoke 12 is formed with a few holes 12c. In the case of molding, a molding material is also poured into the hole 12c and the housing 6 is formed with holes 6d to be tapped by the setscrews 17'. The screws 17' are tapping screws so that it is not necessary to previously tap the holes 12c of the core yoke 12. It should be noted here that in order to avoid interference between the core yoke 12 and the driving pin 14, the upper ends of the screws 17' must be prevented from extending beyond the upper surface of the housing 6.

Since the housing 6 surrounds vertically the center portion of the core yoke 12 the laminated sheets of the core yoke 12 can be securely overlaid one upon another without caulking them. As a result, it becomes possible to wind the coil 13 without disassembling the laminated core yoke 12.

Recently, in order to isolate the core yoke 12 from the coil 13, thin insulating films are formed over the portions 12d so that the thin insulating films 12d and the housing 6 can be molded simultaneously.

As is clear from the foregoing description, according to the present invention, in a motor for an apparatus for rotating a recording medium in the form of a disc of the type having a driving magnet for generating a force for rotating the disc is securely joined to the outer peripheral portion of a disc-shaped rotor yoke, an auxiliary yoke is securely attached to the outer peripheral portion of the rotor yoke so that magnetic saturation of the rotary yoke leakage of magnetic flux from the driving motor to the exterior can be prevented. Therefore, due to the auxiliary yoke disposed in the manner described above, magnetic saturation and leakage flux can be avoided without increasing the entire thickness of the rotor yoke so that the motor can be made thinner. Thus, the present invention can attain excellent features in that the disc driving apparatus incorporating therein a motor of the type described above can be made thinner.

Furthermore, according to the present invention, screws are tightly screwed into internally threaded holes formed through the core yoke in such a way that the tops of the screws will not extend beyond the surface of the core yoke in opposing relationship with the rotor yoke. As a result, the space defined between the core yoke and the rotor yoke can be decreased in size so that the entire height of the motor can be decreased and consequently the FDDs can be made thinner.

Moreover, employed by the present invention is a construction in which the housing is formed integral with the center portion of the core yoke by the molding process so that assembly of the core yoke can be considerably simplified and therefore the cost of the motor can be decreased accordingly.

The present invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A thin compact motor for a disc drive for rotating a recording medium comprising:

a rotor yoke having an outer peripheral portion, said rotor yoke rotationally driving said recording medium;

a driving magnet for generating a rotating force, said driving magnet being joined to the outer peripheral portion of said rotor yoke;

a substrate;

a core yoke having a coil mounted thereon disposed in parallel and in opposing relationship with said rotor yoke;

a mounting member attaching said core yoke to said substrate, an end of said mounting member not projecting beyond said core yoke thereby minimizing a distance between said rotor and core yokes;

an auxiliary yoke joined to the outer peripheral portion of said rotor yoke, said auxiliary yoke preventing magnetic saturation of said rotor yoke and leakage of magnetic flux from said driving magnet through the outer peripheral portion of said rotor yoke; and a chucking mechanism joined to said rotor yoke for holding said recording medium, said chucking mechanism having a driving member which transmits rotation of said rotor yoke to the recording medium, said driving member being movable between a first position in which said driving member engages said recording medium and a second position in which said driving member does not engage said recording medium, said driving member being projected toward said core yoke without abutting against the end of said mounting member at said second position.

2. A motor as set forth in claim 1, wherein the outer peripheral portion of said rotor yoke has inner and outer surfaces, said driving magnet being joined to the inner surface of said rotor yoke and said auxiliary yoke being joined to and surrounding the outer surface of said rotor yoke.

3. A motor as set forth in claim 1, wherein said auxiliary yoke is interposed between the outer peripheral portion of said rotor yoke and said driving magnet.

4. A thin compact motor for a disc drive for rotating a recording medium comprising:

a rotor yoke, having a main body of a first thickness and an outer peripheral portion of a second thickness, for rotationally driving said recording medium, the second thickness of said outer peripheral portion being greater than the first thickness of the main body of said rotor yoke;

a driving magnet for generating a rotating force, said driving magnet being attached to the outer peripheral portion of said rotor yoke, said outer peripheral portion preventing magnetic saturation of said rotor yoke and leakage of magnetic flux from said driving magnet;

a substrate;

a core yoke having a coil mounted thereon disposed in parallel and in opposing relationship with said rotor yoke;

a mounting member attaching said core yoke to said substrate, an end of said mounting member not projecting beyond said core yoke thereby minimizing a distance between said rotor and core yokes; and a chucking mechanism joined to said rotor yoke for holding said recording medium, said chucking mechanism having a driving member which transmits rotation of said rotor yoke to the recording medium, said driving member being movable between a first position in which said driving member engages said recording medium and a second position in which said driving member does not engage said recording medium, said driving member being projected toward said core yoke without abutting against the end of said mounting member at said second position.

* * * * *